United States Patent
Zhang et al.

(10) Patent No.: US 12,125,496 B1
(45) Date of Patent: Oct. 22, 2024

(54) METHODS FOR NEURAL NETWORK-BASED VOICE ENHANCEMENT AND SYSTEMS THEREOF

(71) Applicant: Sanas.ai Inc., Palo Alto, CA (US)

(72) Inventors: Shawn Zhang, Palo Alto, CA (US); Lukas Pfeifenberger, Salzburg (AT); Jason Wu, Santa Clara, CA (US); Piotr Dura, Warsaw (PL); David Braude, Edinburgh (GB); Bajibabu Bollepalli, Cottenham (GB); Alvaro Escudero, San Sebastian de los Reyes (ES); Gokce Keskin, Mountain View, CA (US); Ankita Jha, Bangalore (IN); Maxim Serebryakov, Palo Alto, CA (US)

(73) Assignee: SANAS.AI INC., Palo Alto, CA (US)

( * ) Notice: Subject to any disclaimer, the term of this patent is extended or adjusted under 35 U.S.C. 154(b) by 0 days.

(21) Appl. No.: 18/644,959

(22) Filed: Apr. 24, 2024

Related U.S. Application Data

(60) Provisional application No. 63/464,432, filed on May 5, 2023.

(51) Int. Cl.
*G10L 15/00* (2013.01)
*G10L 15/02* (2006.01)
(Continued)

(52) U.S. Cl.
CPC .......... *G10L 21/0232* (2013.01); *G10L 15/02* (2013.01); *G10L 15/063* (2013.01);
(Continued)

(58) Field of Classification Search
CPC ....... G10L 15/16; G10L 19/005; G10L 19/00; G10L 25/27; G10L 25/30; G10L 15/02;
(Continued)

(56) References Cited

U.S. PATENT DOCUMENTS

| 11,410,684 B1* | 8/2022 | Klimkov ................. G10L 25/78 |
| 11,482,235 B2* | 10/2022 | Hsiung .................. G06N 20/20 |

(Continued)

*Primary Examiner* — Vu B Hang
(74) *Attorney, Agent, or Firm* — Troutman Pepper Hamilton Sanders LLP

(57) ABSTRACT

The disclosed technology relates to methods, voice enhancement systems, and non-transitory computer readable media for real-time voice enhancement. In some examples, input audio data including foreground speech content, non-content elements, and speech characteristics is fragmented into input speech frames. The input speech frames are converted to low-dimensional representations of the input speech frames. One or more of the fragmentation or the conversion is based on an application of a first trained neural network to the input audio data. The low-dimensional representations of the input speech frames omit one or more of the non-content elements. A second trained neural network is applied to the low-dimensional representations of the input speech frames to generate target speech frames. The target speech frames are combined to generate output audio data. The output audio data further includes one or more portions of the foreground speech content and one or more of the speech characteristics.

20 Claims, 8 Drawing Sheets

(51) Int. Cl.
*G10L 15/06* (2013.01)
*G10L 21/0232* (2013.01)
*G10L 25/30* (2013.01)
*G10L 15/16* (2006.01)
*G10L 15/22* (2006.01)

(52) U.S. Cl.
CPC .............. *G10L 25/30* (2013.01); *G10L 15/16* (2013.01); *G10L 15/22* (2013.01)

(58) Field of Classification Search
CPC ....... G10L 15/063; G10L 15/08; G10L 15/07; G10L 15/20; G10L 15/22; G10L 15/26; G10L 15/30; G10L 15/12; G10L 21/0208; G10L 25/78; G10L 25/87
See application file for complete search history.

(56) References Cited

U.S. PATENT DOCUMENTS

| | | | |
|---|---|---|---|
| 11,705,147 B2 * | 7/2023 | Visser .................... | G06N 3/044 |
| | | | 704/200 |
| 11,868,883 B1 * | 1/2024 | Commons ............... | G06F 40/30 |

* cited by examiner

METHODS FOR NEURAL NETWORK-BASED VOICE ENHANCEMENT AND SYSTEMS THEREOF

This application claims priority to U.S. Provisional Patent Application Ser. No. 63/464,432, filed May 5, 2023, which is hereby incorporated herein by reference in its entirety.

FIELD

This technology generally relates to audio analysis and, more particularly, to methods and systems for voice enhancement using neural networks.

BACKGROUND

Many environments, such as inside of a vehicle, a bustling street, or a busy office, are susceptible to disruptive noise that can obstruct speech. The level of background noise can range from the quiet humming of a computer fan to the noisy chatter of a crowded café. This noise can not only directly hinder a listener's ability to understand speech but also lead to further unwanted distortions when the speech is processed. Voice enhancement techniques can be employed to enhance quality and clarity of speech, often with a focus on reducing noise.

In customer service roles, for example, where clear communication is essential for customer satisfaction, voice enhancement is used to improve the quality of calls and reduce misunderstandings. In the medical field, voice enhancement technology is used to enhance the quality of recordings of medical consultations, which can be useful for training and research purposes. In education, voice enhancement technology is used to help students with hearing impairments understand lectures and discussions more clearly, and there are many other use cases and applications of voice enhancement technology.

One approach for voice enhancement and noise suppression in speech signals is through speech separation, which considers all background sounds as noise. Speech separation processing is often carried out in the short-time Fourier transform (STFT) domain. Ratio mask is another technique employed to distinguish speech signals from background noise, providing a means to diminish noise and enhance speech signals. Ratio mask leverages a representation of the signal-to-noise ratio (SNR) at each frequency band within an audio signal.

Another approach used in voice enhancement is equalization, which involves adjusting the frequency response of a speech signal to enhance its clarity and naturalness. The voice enhancement process involves regulating the level of various frequency components in the speech signal to improve the clarity of speech.

While current enhancement techniques can decrease noise and enhance the quality of the signal that is perceived, they can also distort the speech features that are necessary for speech recognition. This distortion caused by the suppression of noise can be more severe than the noise itself, which can result in inaccurate results when using automatic speech recognition (ASR) software. Additionally, current voice enhancement methods are only capable of attempting to preserve original speech audio, which can present a challenge when the original speech is unclear due to characteristics such as slurring, mumbling, or being too quiet.

For instance, a customer care representative may develop a sore throat and find it difficult to speak clearly on phone, while another representative may become fatigued and have trouble speaking clearly after extended periods of speaking on the phone. Moreover, people with speech patterns that are naturally unclear or indistinct, such as mumbling, creakiness, slurring, or quiet speech, may find that these characteristics hinder their ability to speak clearly and be easily understood. In another example, people with speech disorders, such as dysarthria or apraxia, can make it difficult for them to communicate effectively.

Since many current voice enhancement methods focus on noise removal, they have reduced effectiveness when the speech itself is not intelligible. Other current voice enhancement techniques fail to sufficiently enhance the quality, clarity, comprehensibility, and intelligibility of degraded speech signals.

BRIEF DESCRIPTION OF THE DRAWINGS

The disclosed technology is illustrated by way of example and not limitation in the accompanying figures, in which like references indicate similar elements.

DETAILED DESCRIPTION

Examples described below may be used to provide methods, devices (e.g., a non-transitory computer readable medium), apparatuses, and/or systems for neural network-based voice enhancement and noise suppression. Although the technology has been described with reference to specific examples, various modifications may be made to these examples without departing from the broader spirit and scope of the various embodiments of the technology described and illustrated by way of the examples herein. This technology advantageously improves speech clarity and intelligibility in various applications by utilizing noise suppression algorithms that more accurately estimate the background noise signal from a single microphone recording, thereby suppressing noise without distorting the target or output enhanced speech data.

Figure 1:
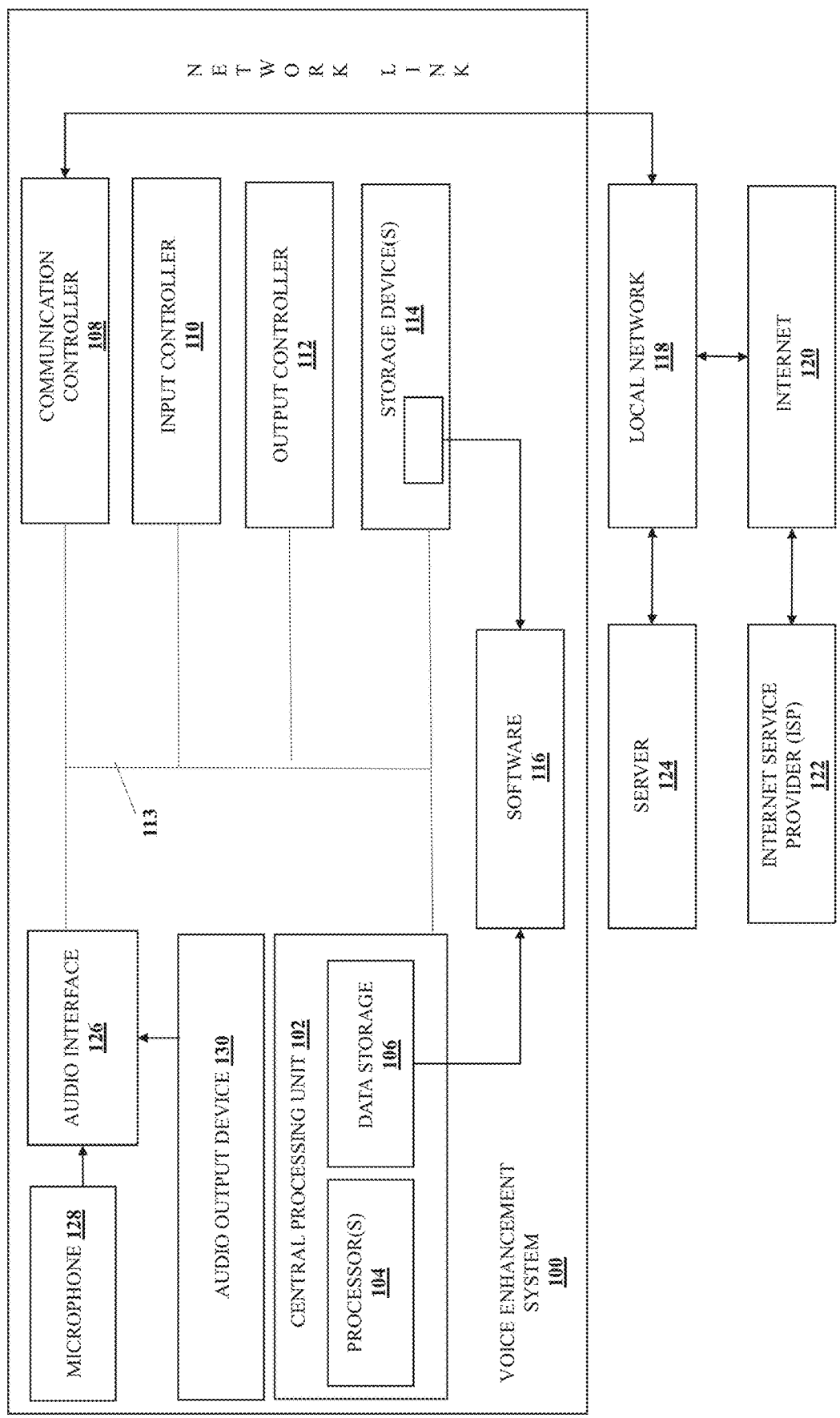
FIG. 1 is a block diagram of an exemplary network environment that includes a voice enhancement system.

Referring now to FIG. 1, a block diagram of an exemplary network environment that includes a voice enhancement system 100 is illustrated. The voice enhancement system 100 in this example includes processor(s) 104, which are designed to process instructions (e.g., computer readable instructions (i.e., code)) stored on the storage device(s) 114 (e.g., a non-transitory computer readable medium) of the voice enhancement system 100. By processing the stored instructions, the processor(s) 104 may perform the steps and functions disclosed herein, such as with reference to FIG. 5, for example.

The storage device(s) 114 may be optical storage device(s), magnetic storage device(s), solid-state storage device(s) (e.g., solid-state disks (SSDs)), non-transitory storage device(s), another type of memory, and/or a combination thereof, for example, although other types of storage device(s) can also be used. The storage device(s) 114 may contain software 116, which is a set of instructions (i.e., program code). Alternatively, instructions may be stored in one or more remote storage devices, for example storage devices (e.g., hosted by a server 124) accessed over a local network 118 or the Internet 120 via an Internet Service Provider (ISP) 122.

The voice enhancement system 100 also includes an operating system and microinstruction code in some examples, one or both of which can be hosted by the storage device(s) 114. The various processes and functions described herein may either be part of the microinstruction code and/or program code (or a combination thereof), which is executed via the operating system. The voice enhancement system 100 also may have data storage 106, which along with the processor(s) 104 form a central processing unit (CPU) 102, an input controller 110, an output controller 112, and/or a communication controller 108. A bus 113 may operatively couple components of the voice enhancement system 100, including processor(s) 104, data storage 106, storage device(s) 114, input controller 110, output controller 112, and/or any other devices (e.g., a network controller or a sound controller).

The output controller 112 may be operatively coupled (e.g., via a wired or wireless connection) to a display device (e.g., a monitor, television, mobile device screen, touch-display, etc.) in such a fashion that output controller 112 can transform the display on the display device (e.g., in response to the execution of module(s)). Input controller 110 may be operatively coupled (e.g., via a wired or wireless connection) to an input device (e.g., mouse, keyboard, touchpad scroll-ball, touch-display, etc.) in such a fashion that input can be received from a user of the voice enhancement system 100.

The communication controller 108 is coupled to a bus 113 in some examples and provides a two-way coupling through a network link to the Internet 120 that is connected to a local network 118 and operated by an ISP 122, which provides data communication services to the Internet 120. The network link typically provides data communication through one or more networks to other data devices. For example, a network link may provide a connection through local network 118 to a host computer and/or to data equipment operated by the ISP 122. A server 124 may transmit requested code for an application through the Internet 120, ISP 122, local network 118, and/or communication controller 108.

The audio interface 126, also referred to as a sound card, includes sound processing hardware and/or software, including a digital-to-analog converter (DAC) and an analog-to-digital converter (ADC). The audio interface 126 is coupled to a physical microphone 128 and an audio output device 130 (e.g., headphones or speaker(s)) in this example, although the audio interface 126 can be coupled to other types of audio devices in other examples. Thus, the audio interface 126 uses the ADC to digitize input analog audio signals from a sound source (e.g., the microphone 128) so that the digitized signals can be processed by the voice enhancement system 100, such as according to the methods described and illustrated herein. The DAC of the audio interface 126 can convert generated digital audio data into an analog format for output via the audio output device 130.

The voice enhancement system 100 is illustrated in FIG. 1 with all components as separate devices for ease of identification only. One or more of the components of the voice enhancement system 100 in other examples may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The voice enhancement system 100 also may be one or more servers, for example a farm of networked or distributed servers, a clustered server environment, or a cloud network of computing devices. Other network topologies can also be used in other examples.

Figure 2:
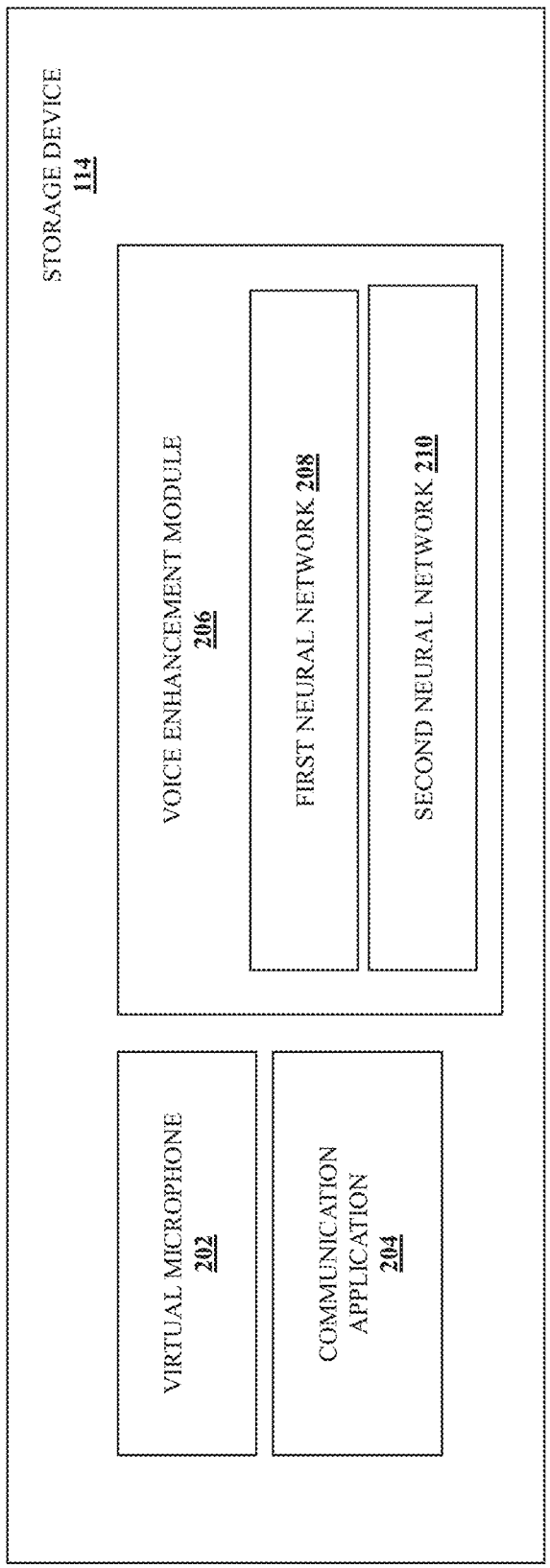
FIG. 2 is a block diagram of an exemplary storage device of the voice enhancement system of FIG. 1.

Referring now to FIG. 2, a block diagram of an exemplary one of the storage device(s) 114 of the voice enhancement system 100 is illustrated. The storage device 114 may include a virtual microphone 202, a communication application 204, and a voice enhancement module 206 with a first neural network 208 and a second neural network 210, although other types and/or number of applications or modules can also be included in the storage device 114 in other examples. The virtual microphone 202 receives input audio data (e.g., digitized input audio signals) from the physical microphone 128, which is communicated to the voice enhancement module 206.

The virtual microphone 202 then receives the output of the second neural network 210 from the voice enhancement module 206, which represents output audio data including target speech that is an enhanced version of the input audio data and provides the output to the communication application 204. The communication application 204 can be audio or video conferencing or other software that provides an interface to a user of the voice enhancement system 100, for example.

Thus, the voice enhancement module 206 performs voice enhancement and/or noise suppression to convert the input audio data into the output audio data using the first and second neural networks 208 and 210, respectively. The first neural network 208 receives input audio data, fragments the input audio data into frames, and converts the frames to low-dimensional representations, also referred to as a reduced-dimension representation, having lower dimensionality than that of the input audio data. The first neural network 208 can be trained as explained in more detail below with reference to FIG. 6.

The second neural network 210 receives the low-dimensional representations of the frames, converts the low-dimensional representations to corresponding target speech frames, and generates target speech frames, and combines the target speech frames to generate output audio data. The second neural network 210 can be trained as explained in more detail below with reference to FIG. 7. The operation of the voice enhancement module 206 is described in more detail below with reference to FIG. 5. In some examples, the virtual microphone 202 and the voice enhancement module 206 are combined within the same software application or other type of module.

Figure 3:
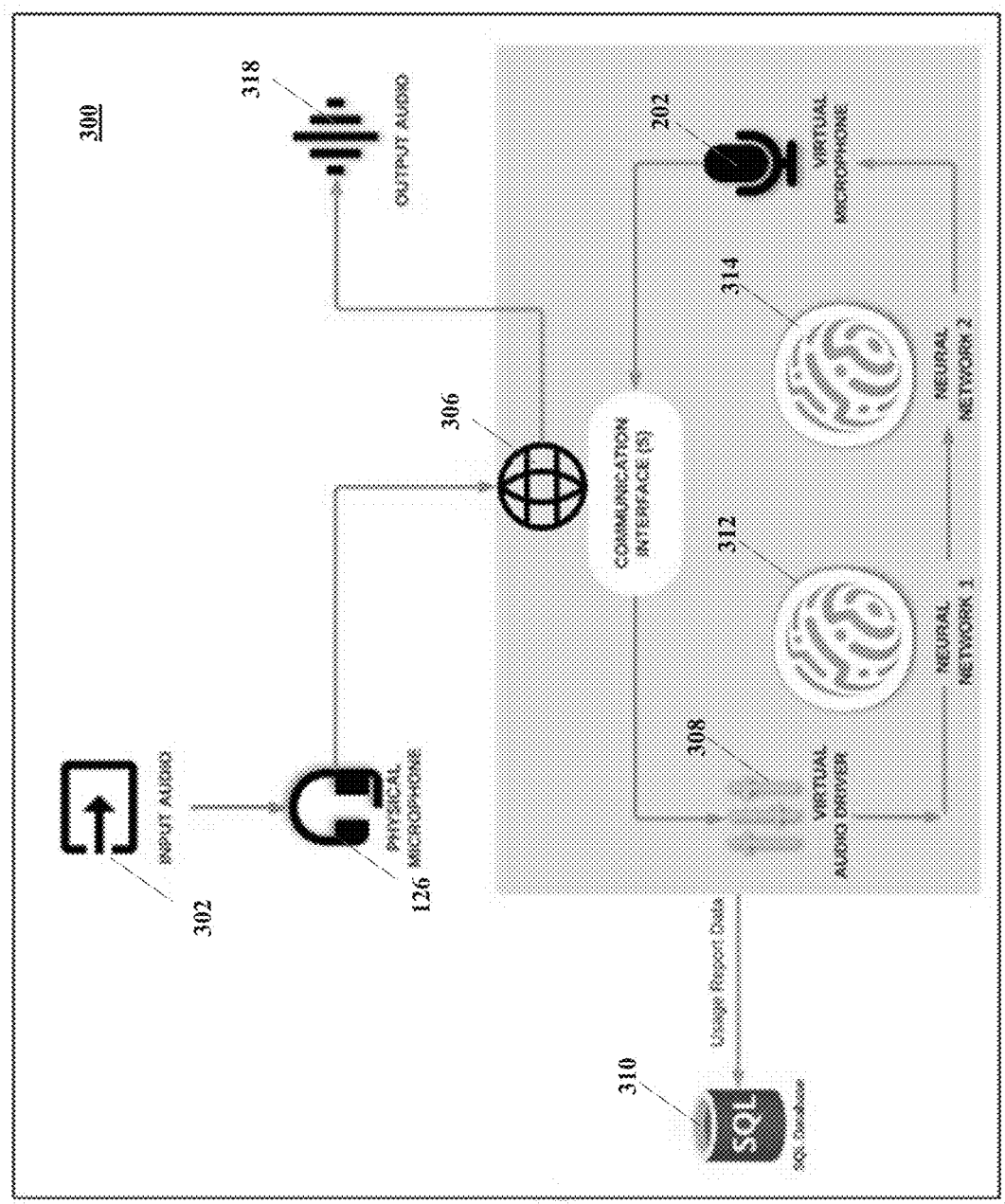
FIG. 3 is a flow diagram of a method for real-time voice enhancement.

Referring now to FIG. 3, a flow diagram of a method 300 for real-time voice enhancement is illustrated. In this example, a user of the voice enhancement system 100 may provide input audio 302 via analog audio signals received by a physical microphone 128 of the voice enhancement system 100 and subsequently digitized by the audio interface 126. The physical microphone 128 can be an integrated component of the voice enhancement system 100 (e.g., an onboard microphone of a laptop computer or smartphone). In other examples, the physical microphone 128 can be a wired or wireless peripheral device (e.g., a webcam or a dedicated hardware microphone) that is connected to an I/O interface of the voice enhancement system 100, and other exemplary physical microphones can also be used in yet other examples.

The digitized input audio 302 in this example is then routed from the physical microphone 128 over a communication interface 306 to a virtual audio driver 308. Advantageously, the voice enhancement may be accomplished locally on the voice enhancement system 100 in examples in which the communication interface 306 is the bus 113, which may minimize latency as compared to deployments that utilize cloud-based computing in which the communication interface 306 is the local network 118 and/or the Internet 120, for example. Optionally, usage report data can be generated and maintained in a local or remote database 310.

The digitized input audio 302 is then routed from the virtual audio driver 308 to a first neural network 208 and a second neural network 210 to enhance the voice and/or suppress the noise in the input audio 302, as described and illustrated in more detail below. The output of the second neural network 210 is a digital version of the input audio 302 converted according to the voice enhancement and/or noise suppression methods described and illustrated herein, which is provided to a virtual microphone 202 executed by the voice enhancement system 100. The virtual microphone 202 in this example uses the communication interface 306 to provide analog output audio 318 corresponding to the converted input audio 302.

Accordingly, in some examples, the software 116 that facilitates the voice enhancement and/or noise suppression may function as the virtual microphone 202 that receives the input audio 302 from the physical microphone 128 and performs voice enhancement and/or noise suppression to convert the input audio 302 into the output audio 318, as explained herein. The virtual microphone 202 then routes the converted output audio 318 via the communication interface 306 to the communication application 204 (e.g., Zoom™, Skype™, Viber™, Telegram™, etc.) executed by the voice enhancement system 100, which would otherwise receive the input audio 302 directly from the physical microphone 128 without the technology described and illustrated by way of the examples herein.

Figure 4:
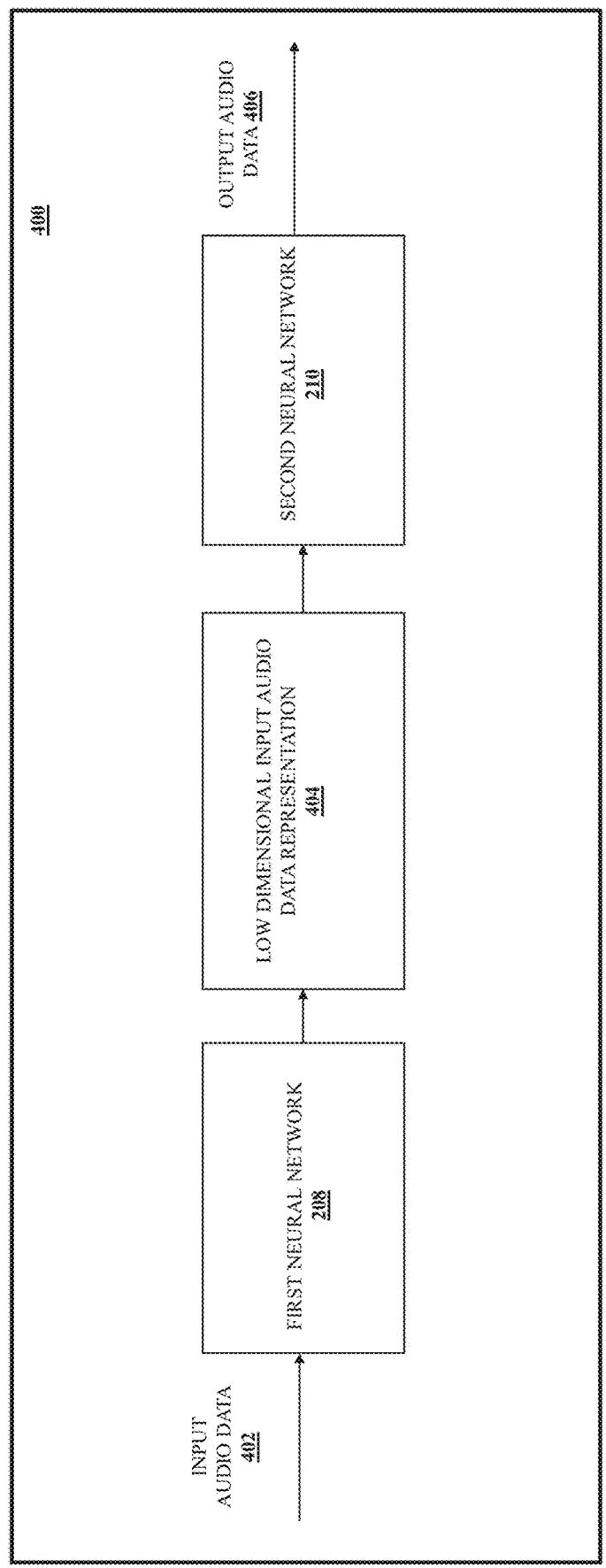
FIG. 4 is a flow diagram of another method for real-time voice enhancement.

Referring now to FIG. 4, a flow diagram of another method 400 for real-time voice enhancement is illustrated. In this example, the voice enhancement system 100 applies the first neural network 208 to received input audio 302 that has been digitized to generated input audio data 402. The first neural network dynamically converts the input audio data 402 to a low-dimensional input audio data representation 404.

The voice enhancement system 100 then applies the second neural network 210 to the low-dimensional input audio data representation 404 to dynamically generate output audio data 406, which can be converted to analog signals before being output as output audio 318. The target speech of the output audio data 406 has enhanced voice and/or suppressed noise as compared to the input speech of the input audio data 402 as a result of the application of the first and second neural networks 208 and 210, respectively. The output audio data 406 can then be output or provided, such as to the digital communication application 204, for example, as explained above.

Figure 5:
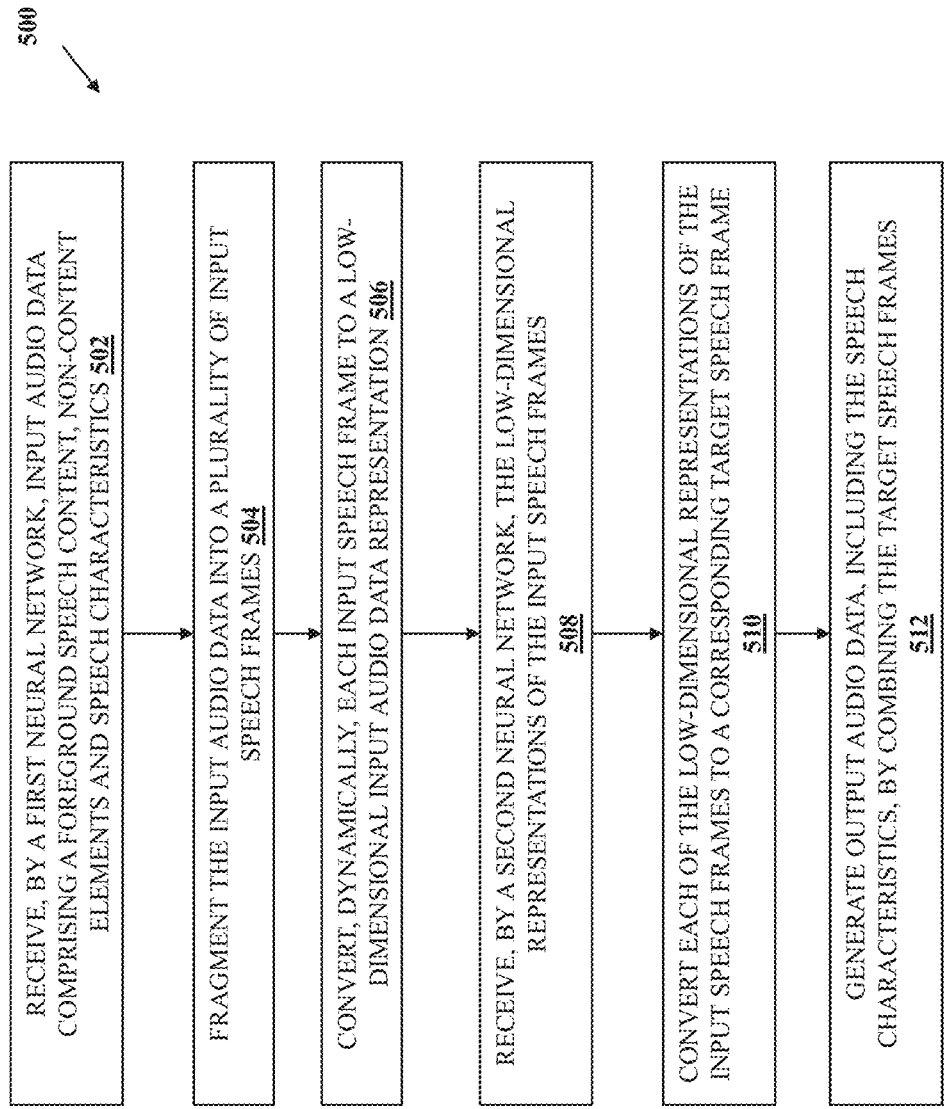
FIG. 5 is a flowchart of an exemplary method for real-time voice enhancement.

Referring to FIG. 5, a flowchart of an exemplary method 500 for real-time voice enhancement is illustrated. In step 502 in this particular example, the voice enhancement system 100 provides to the first neural network 208 input audio data 402 including foreground speech content, one or more non-content elements, and a set of speech characteristics.

Figure 6:
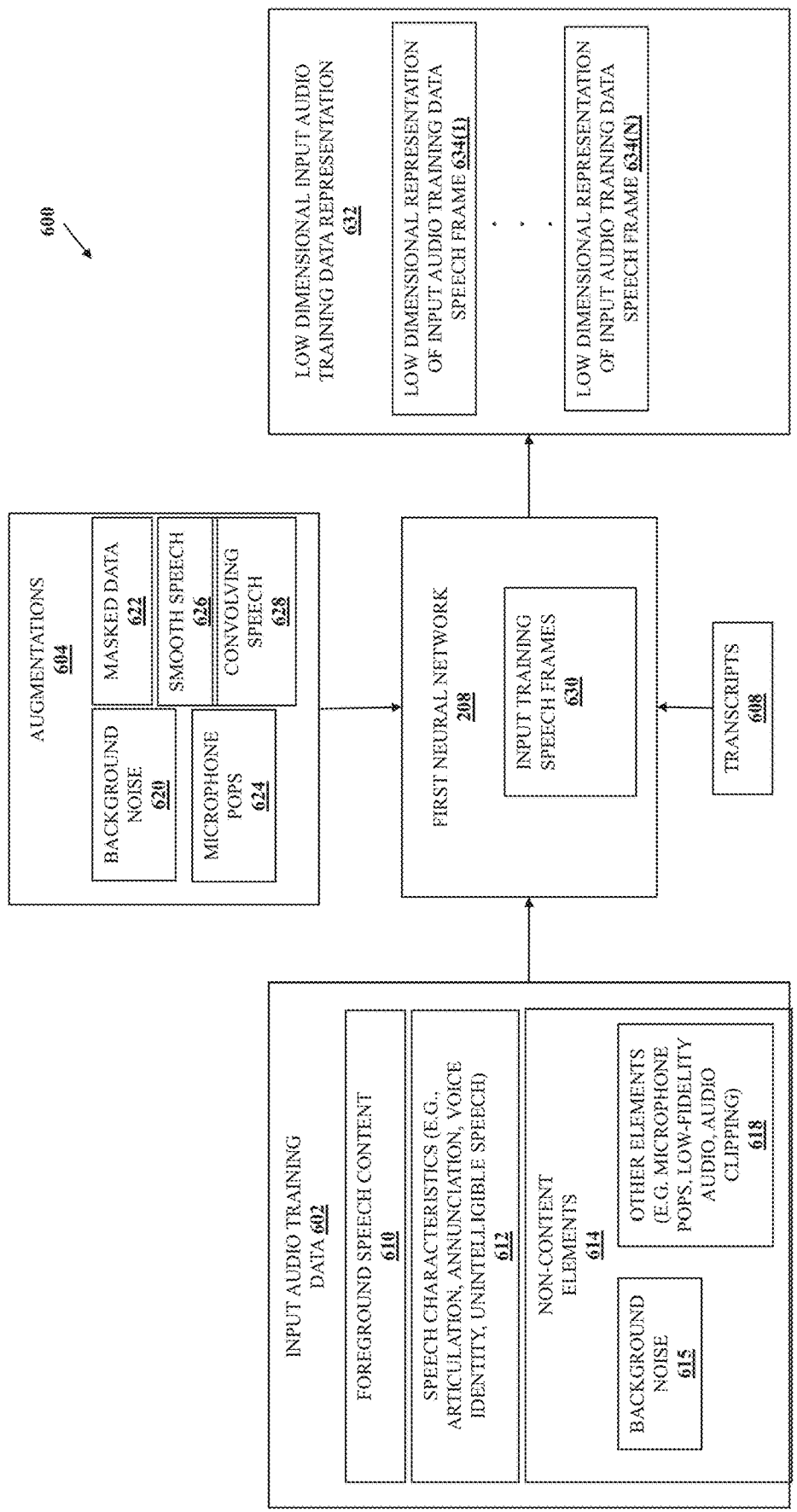
FIG. 6 is a schematic diagram of an exemplary method for training a first neural network.

Referring to FIG. 6, a schematic diagram of an exemplary method 600 for training the first neural network 208 is illustrated. In this example, the first neural network 208 may be trained with input audio training data 602, one or more augmentations 604, and one or more transcripts 608, although additional training data can also be used in other examples. The input audio training data 602 in this example includes foreground speech content 610, a set of speech characteristics 612, and one or more non-content elements 614.

The speech characteristics 612 may include one or more of pitch, intonation, melody, stress, articulation, annunciation, voice identity, and/or unintelligible speech, for example. The unintelligible speech can be caused by one or more factors such as background noise, poor enunciation, heavy accents, language barriers and/or mumbled, creaky, slurred, and/or quiet speech, for example.

In some examples, the non-content elements 614 may include background noise 616 and other elements 618 such as microphone pops, low-fidelity audio, and/or audio clipping, although other types of background noise can also be used. The augmentations 604 may include background noise 620, masked data 622, microphone pops 624, smooth speech 626, and/or convolving speech 628, although other augmentations can also be used in other examples. The augmentations in this example are included to simulate degraded speech characteristics.

The input audio training data 602 in this example may be fragmented into a plurality of input training speech frames 630. Input training speech frames 630 may be converted dynamically to a low-dimensional input audio training data representation 632 by the first neural network 208. The low-dimensional input audio training data representation 632 may comprise multiple low-dimensional representations of input audio training data speech frames 634(1)-634(n). The low-dimensional input audio training data representation 632 may further include one or more portions of the foreground speech content 610 and/or the speech characteristics 612. Other methods for training the first neural network 208 can also be used in other examples.

Thus, the first neural network 208 may be optimized by the voice enhancement system 100 to learn a mapping between the input training speech frames and the low-dimensional input audio data training data representation 632, using techniques such as supervised learning or reinforcement learning, for example. The first neural network 208 also may be fine-tuned by the voice enhancement system 100 using additional data to improve the performance, and the hyperparameters of the first neural network 208 may be optimized to obtain improved results.

Referring back to FIG. 5, in step 504, the voice enhancement system 100 applying the first neural network 208 fragments the input audio data 402 received in step 502 into a plurality of input speech frames. In step 506, the voice enhancement system 100 applying the first neural network 208 dynamically converts each of the input speech frames fragmented in step 504 to a low-dimensional input audio data representation 404.

In some examples, the low-dimensional input audio data representation 404 comprises foreground speech content and at least one or more of the speech characteristics of the audio data received in step 502. The low-dimensional input audio data representation 404 may omit any number of the non-content elements of the audio data received in step 502 (e.g., background noise, and other elements such as microphone pops, low-fidelity audio, and audio clippings).

In other examples, the low-dimensional input audio data representation 404 generated by the first neural network 208 may be achieved by pre-processing the input audio data 402 to remove noise and other distortions that may affect the quality of the speech signal. For example, a noise reduction algorithm may be applied to remove background noise, or a filtering technique may be used to remove high-frequency noise or pops.

Once the input audio data 402 is optionally pre-processed, features may be extracted by the voice enhancement system 100 such as by using Fourier Transform, Mel-Frequency Cepstral Coefficients (MFCC), or other techniques. These extracted features capture important characteristics of the resulting speech signal such as pitch, intonation, and formants, for example. The extracted features may be encoded by the voice enhancement system 100 into the low-dimensional input audio data representation 404 in step 506 using techniques such as Principal Component Analysis (PCA), Linear Discriminant Analysis (LDA), or other dimensionality reduction techniques, for example. The resulting low-dimensional input audio data representation 404 may capture the most important characteristics of the resulting speech signal while reducing the computational complexity of the first neural network 208.

In some examples, the low-dimensional input audio data representation 404 of the input speech may be achieved by using a hierarchical feature extraction network that extracts multiple levels of features from the input audio data 402. Each level of the network could be designed to capture different aspects of the input audio data 402, such as frequency content, temporal dynamics, and/or speech characteristics, for example. At each level of the hierarchical feature extraction network, the extracted features could be compressed into a low-dimensional input audio data representation 404 using a compression algorithm such as principal component analysis (PCA) or non-negative matrix factorization (NMF), for example.

The resulting compressed features may be passed to the next level of the hierarchical feature extraction network for further processing. This approach advantageously captures more detailed aspects of the input audio data 402 than traditional methods that rely on a single, fixed feature representation. The use of compression algorithms allows for efficient processing and storage of the feature representations, which may improve the accuracy and efficiency of real-time voice enhancement by providing a more detailed and robust representation of the input audio data 402.

Figure 7:
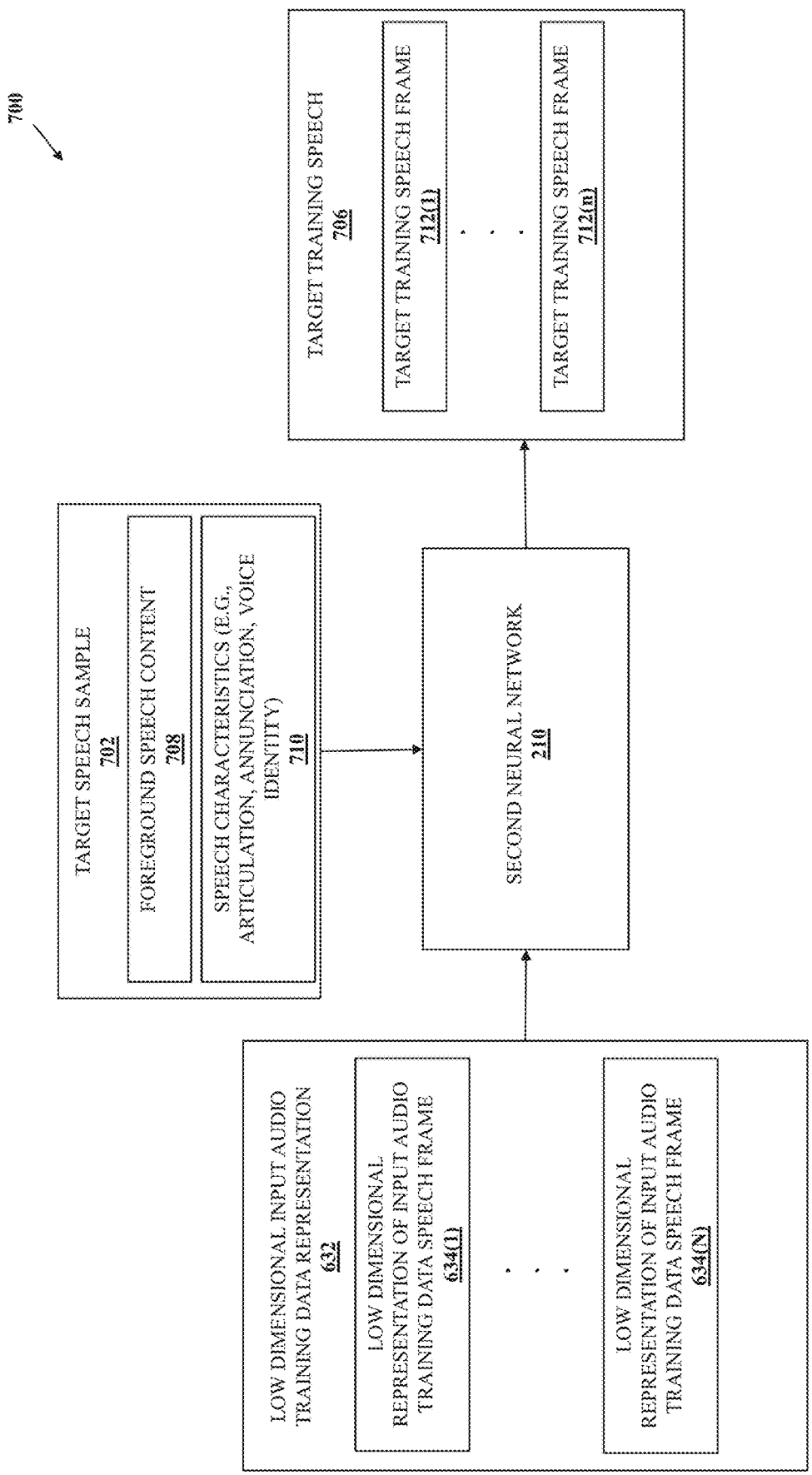
FIG. 7 is a schematic diagram of another exemplary method for training a second neural network.

In step 508, the voice enhancement system 100 provides to the second neural network 210 the low-dimensional input audio data representation 404 generated in step 508. Referring now to FIG. 7, a schematic diagram of an exemplary method 700 for training the second neural network 210 is illustrated. The second neural network 210 may be trained using target speech sample 702 and low-dimensional representation of input training speech 704 to dynamically generate target training speech 706. The target speech sample 702 may include foreground speech content 708 and/or speech characteristics 710 (e.g., articulation, annunciation, voice identity, and/or unintelligible speech). The foreground speech content 708 and/or the speech characteristics 710 may be the same or different than the foreground speech content 610 and the speech characteristics 612, respectively.

The second neural network 210 may receive the low-dimensional input audio training data representation 632 and convert each of the low-dimensional representation of input audio training data speech frames 634(1)-634(n) to a respective corresponding one of the target training speech frames 712(1)-712(n). The target training speech 706 can include one or more of the speech characteristics 710 and can be generated dynamically by combining the target training speech frames 712(1)-712(n). Other methods for training the second neural network 210 can also be used in other examples.

In some examples, the second neural network 210 is trained to convert each of the low-dimensional representation of input audio training data speech frames 634(1)-634(n) with the respective corresponding one of the target training speech frames 712(1)-712(n) in real-time, which may be achieved using dynamic conversion. Dynamic conversion may allow for the efficient processing of the input audio data 402, ensure that the resulting target speech of the output audio data 406 may contain the desired speech characteristics, and enable real-time voice enhancement without the need for a separate conversion step.

Thus, the second neural network 210 may be initially trained using supervised learning to convert the low-dimensional representation of input audio training data speech frames 634(1)-634(n) in real-time. The second neural network 210 may be trained to learn the conversion between the low-dimensional representation of input audio training data speech frames 634(1)-634(n) and the target training speech frames 712(1)-712(n) using a loss function that minimizes the difference between the predicted and actual target speech frames, for example.

Once the second neural network 210 is trained using supervised learning, it may be further fine-tuned using an unsupervised learning approach. The second neural network 210 may be trained to learn the underlying structure of the low-dimensional representation of input audio training data speech frames 634(1)-634(n) without being provided with explicit target training speech frames, which may be achieved by training the second neural network 210 to predict future speech frames from past speech frames, without any knowledge of the target training speech frames. This training approach may help the second neural network 210 learn more robust and generalizable low-dimensional representation of input audio training data speech frames, which may be useful for converting input speech frames in real-time.

In yet other examples, diffusion probabilistic model(s), flow-based model(s), and/or generative adversarial network (GAN)-based model(s) can be used for the second neural network 210. Using diffusion probabilistic models, the second neural network 210 can be trained to iteratively refine relatively noisy input audio data 402 to generate relatively high-quality speech in the output audio data 406. Flow-based models are configured to learn transformations to map the distribution of relatively noisy input audio data 402 to relatively high-quality speech in the output audio data 406. Additionally, GAN-based models can be used to train a "discriminator" for the second neural network 210 to distinguish between relatively poor-quality speech in the input audio data 402 and relatively high-quality speech in the output audio data 406. Other types of models can also be used to train the second neural network 210 in other examples.

Referring back to FIG. 5, in step 510, the voice enhancement system 100 applying the second neural network 210 converts each frame of the low-dimensional input audio data representation 404 to a corresponding target speech frame (e.g., a frame of output audio data 406). In some examples, converting each frame of the low-dimensional input audio data representation 404 to a corresponding target speech frame may involve using unsupervised learning algorithms, such as clustering or dimensionality reduction techniques, to identify patterns and relationships within the frames of the low-dimensional input audio data representation 404 and target speech frames.

In other examples, converting each frame of the low-dimensional input audio data representation 404 to a corresponding target speech frame may involve using reinforcement learning algorithms to train the second neural network 210 to optimize the conversion process by adjusting a set of parameters in real-time based on feedback from the generated output audio data 406. This may allow the conversion process to adapt and improve over time based on the specific characteristics of the input speech and the desired speech characteristics.

In step 512, the voice enhancement system 100 applying the second neural network 210 combines the target speech frames to dynamically generate the output audio data 406 that includes the target speech and one or more of the speech characteristics received in step 502. The patterns learned in step 510 may be used in step 512 to generate the enhanced speech signal, which is also referred to herein as the output audio data 406.

Figure 8:
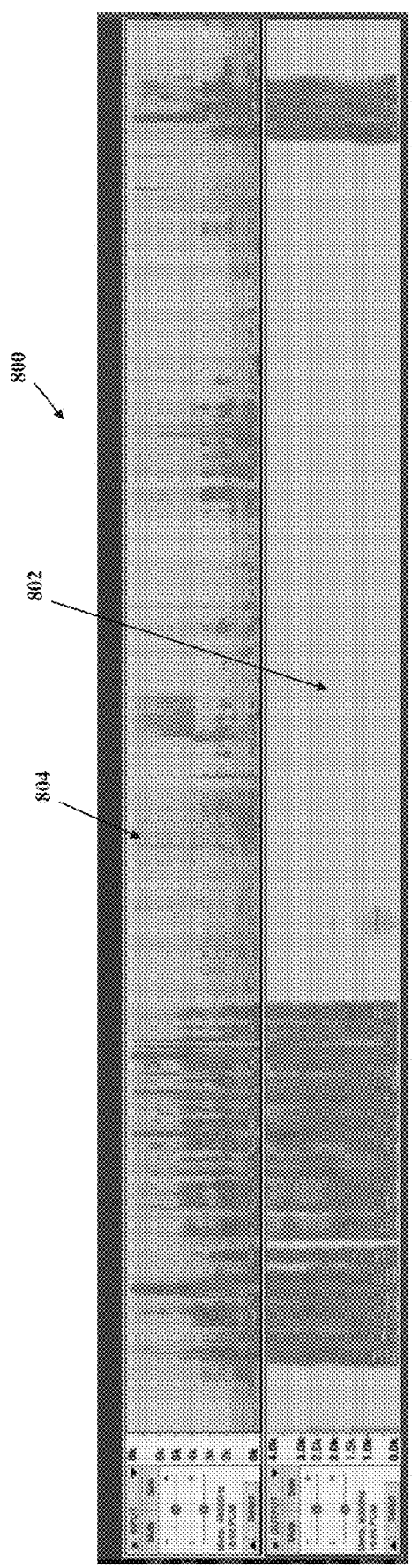
FIG. 8 is an exemplary representation of converting a low-dimensional representation of input speech frames to target speech frames.

Referring to FIG. 8, an exemplary representation 800 of converting a low-dimensional representation 404 of input speech frames to target speech frames is illustrated. The output or target speech 802 shown in the representation 800 and generated based on the technology described and illustrated herein, may advantageously preserve the speech characteristics and enhance the quality, clarity, comprehensibility, and/or intelligibility of degraded speech signals of the input speech 804.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A voice enhancement system, comprising memory having instructions stored thereon and one or more processors coupled to the memory and configured to execute the instructions to:
   fragment input audio data into a plurality of input speech frames, wherein the input audio data comprises foreground speech content, one or more non-content elements, and one or more speech characteristics;
   convert the input speech frames to low-dimensional representations of the input speech frames, wherein one or more of the fragmentation or the conversion is based on an application of a first neural network to the input audio data and the low-dimensional representations of the input speech frames omit one or more of the non-content elements;
   apply a second neural network to the low-dimensional representations of the input speech frames to generate target speech frames; and
   combine the target speech frames to generate output audio data, wherein the output audio data further comprises one or more portions of the foreground speech content and one or more of the speech characteristics.

2. The voice enhancement system of claim 1, further comprising a physical microphone and an audio output device, wherein the one or more processors are further configured to execute the instructions to:
   digitize analog input audio signals obtained via the physical microphone to generate the input audio data;
   convert the output audio data to analog audio output signals; and
   provide the analog audio output signals to the audio output device via one or more of a virtual microphone or a communication application executed by the voice enhancement system.

3. The voice enhancement system of claim 1, wherein the non-content elements comprise one or more of background noise, microphone pops, low-fidelity audio, or audio clippings and the speech characteristics comprise one or more of pitch, intonation, melody, stress, articulation, annunciation, voice identity, or unintelligible speech.

4. The voice enhancement system of claim 1, wherein the one or more processors are further configured to execute the instructions to train the first neural network using input audio training data, one or more augmentations, and one or more transcripts, wherein the first neural network is trained to learn a mapping between input training speech frames fragmented from the input audio training data and low-dimensional representation of input audio training data speech frames.

5. The voice enhancement system of claim 4, wherein the augmentations simulate one or more degraded speech characteristics and comprise one or more of background noise, masked data, microphone pops, smooth speech, or convolving speech.

6. The voice enhancement system of claim 4, wherein the one or more processors are further configured to execute the instructions to train the second neural network using a target speech sample and the low-dimensional representation of input audio training data speech frames, wherein the second neural network is trained to use dynamic conversion to learn a mapping between each of the low-dimensional representation of input audio training data speech frames and a corresponding one of a plurality of target training speech frames.

7. The voice enhancement system of claim 1, wherein the second neural network comprises one or more of a diffusion probabilistic model, a flow-based model, or a generative adversarial network-based model.

8. The voice enhancement system of claim 1, wherein the one or more processors are further configured to execute the instructions to pre-process the input audio data by applying one or more of a noise reduction algorithm to remove background noise from the input audio data or a filtering technique to remove high-frequency noise or pops from the input audio data.

9. The voice enhancement system of claim 1, wherein the one or more processors are further configured to execute the instructions to:

extract one or more features from the input audio data, wherein the features comprise one or more of pitch, intonation, or formants; and encode the extracted features into one or more of the low-dimensional representations of the input speech frames using a dimensionality reduction technique.

10. The voice enhancement system of claim 9, wherein the one or more processors are further configured to execute the instructions to extract the features using a hierarchical feature extraction network comprises a plurality of levels, wherein each of the levels is configured to capture a different one or more of the features and the captured different one or more of the features are compressed at each of the levels.

11. A method for real-time voice enhancement, the method implemented by a voice enhancement system and comprising:

training a first neural network using input audio training data, one or more augmentations, and one or more transcripts and a second neural network using a target speech sample and a plurality of low-dimensional representation of input audio training data speech frames, applying the trained first neural network to convert input speech frames fragmented from input audio data to low-dimensional representations of the input speech frames, wherein the low-dimensional representations of the input speech frames omit one or more non-content elements of the input audio data;

applying the trained second neural network to the low-dimensional representations of the input speech frames to generate target speech frames; and combining the target speech frames to generate output audio data, wherein the output audio data further comprises one or more portions of foreground speech content of the input audio data and one or more speech characteristics of the input audio data.

12. The method of claim 11, wherein the trained first neural network is trained to learn a mapping between input training speech frames fragmented from the input audio training data and the low-dimensional representation of input audio training data speech frames.

13. The method of claim 11, wherein the augmentations simulate one or more degraded speech characteristics and comprise one or more of background noise, masked data, microphone pops, smooth speech, or convolving speech.

14. The method of claim 11, further comprising preprocessing the input audio data by applying one or more of a noise reduction algorithm to remove background noise from the input audio data or a filtering technique to remove high-frequency noise or pops from the input audio data.

15. The method of claim 11, further comprising:

extracting one or more features from the input audio data, wherein the features comprise one or more of pitch, intonation, or formants; and encoding the extracted features into one or more of the low-dimensional representations of the input speech frames using a dimensionality reduction technique.

16. A non-transitory computer-readable medium comprising instructions that, when executed by at least one processor, cause the at least one processor to:

digitize analog input audio signals to generate input audio data;

fragment the input audio data into a plurality of input speech frames, wherein the input audio data comprises foreground speech content, one or more non-content elements, and one or more speech characteristics;

convert the input speech frames to low-dimensional representations of the input speech frames, wherein one or more of the fragmentation or the conversion is based on an application of a first neural network to the input audio data and the low-dimensional representations of the input speech frames omit one or more of the non-content elements;

apply a second neural network to the low-dimensional representations of the input speech frames to generate target speech frames;

combine the target speech frames to generate output audio data, wherein the output audio data further comprises one or more portions of the foreground speech content and one or more of the speech characteristics; and convert the output audio data to analog audio output signals before providing the analog audio output signals to an audio output device.

17. The non-transitory computer-readable medium of claim 16, wherein the non-content elements comprise one or more of background noise, microphone pops, low-fidelity audio, or audio clippings and the speech characteristics comprise one or more of pitch, intonation, melody, stress, articulation, annunciation, voice identity, or unintelligible speech.

18. The non-transitory computer-readable medium of claim 16, wherein the instructions, when executed by the at least one processor further causes the at least one processor to train the first neural network using input audio training data, one or more augmentations, and one or more transcripts, wherein the first neural network is trained to learn a mapping between input training speech frames fragmented from the input audio training data and low-dimensional representation of input audio training data speech frames.

19. The non-transitory computer-readable medium of claim 18, wherein the instructions, when executed by the at least one processor further causes the at least one processor to train the second neural network using a target speech sample and the low-dimensional representation of input audio training data speech frames, wherein the second neural network is trained to use dynamic conversion to learn a mapping between each of the low-dimensional representation of input audio training data speech frames and a corresponding one of a plurality of target training speech frames.

20. The non-transitory computer-readable medium of claim 16, wherein the second neural network comprises one or more of a diffusion probabilistic model, a flow-based model, or a generative adversarial network-based model.

* * * * *